(12) United States Patent
Braford et al.

(10) Patent No.: US 7,121,392 B2
(45) Date of Patent: Oct. 17, 2006

(54) HYDRAULIC DOUBLE CLUTCH

(75) Inventors: Thomas E Braford, Brighton, MI (US); Karl-Heinz Bauer, Graben-Neudorf (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 10/961,828

(22) Filed: Oct. 8, 2004

(65) Prior Publication Data
US 2005/0082136 A1 Apr. 21, 2005

(30) Foreign Application Priority Data
Oct. 11, 2003 (EP) .................. 03023013

(51) Int. Cl.
*F16D 25/00* (2006.01)
(52) U.S. Cl. .................. 192/48.8; 192/48.91
(58) Field of Classification Search ............. 192/48.8, 192/48.91
See application file for complete search history.

(56) References Cited

U.S. PATENT DOCUMENTS

| 3,589,483 | A | * | 6/1971 | Smith .................. 192/3.52 |
| 4,463,621 | A | * | 8/1984 | Fisher .................. 74/330 |
| 4,741,422 | A | | 5/1988 | Fuehrer et al. |
| 4,947,974 | A | * | 8/1990 | Smemo et al. .......... 192/85 AA |
| 4,966,270 | A | * | 10/1990 | Rispeter et al. .......... 192/87.15 |
| 5,887,690 | A | | 3/1999 | Haupt |
| 6,382,382 | B1 | | 5/2002 | Avny et al. |
| 6,401,894 | B1 | * | 6/2002 | Merkel et al. ............. 192/48.9 |
| 6,464,059 | B1 | * | 10/2002 | Kundermann et al. ... 192/87.11 |
| 6,491,149 | B1 | | 12/2002 | Kundermann et al. |
| 6,523,657 | B1 | | 2/2003 | Kundermann et al. |
| 6,929,107 | B1 | * | 8/2005 | Hegerath ................. 192/87.11 |
| 2001/0035328 | A1 | | 11/2001 | Tanikawa |
| 2003/0116396 | A1 | | 6/2003 | Kuhstrebe |
| 2004/0206599 | A1 | | 10/2004 | Hegerath |

FOREIGN PATENT DOCUMENTS

| DE | 101 15 454 A1 | 8/2002 |
| DE | 101 15 453 A1 | 10/2002 |
| DE | 102 03 618 A1 | 2/2003 |
| EP | 0 321 873 B1 | 6/1989 |
| EP | 1 195 537 A1 | 4/2002 |
| EP | 1 378 679 A2 | 1/2004 |

* cited by examiner

*Primary Examiner*—Saul Rodriguez
(74) *Attorney, Agent, or Firm*—Fitch, Even, Tabin & Flannery; Greg Dziegielewski

(57) ABSTRACT

A hydraulic double clutch for a transmission with two coaxially arranged input shafts, a driven clutch housing and two hydraulically actuated clutches with friction disks and annular actuating pistons. The first clutch connects the clutch housing to the first input shaft and the second clutch engages/disengages the clutch housing with/from the second input shaft. Both clutches have a common inner disk carrier that penetrates one actuating piston of the actuating pistons.

6 Claims, 3 Drawing Sheets

HYDRAULIC DOUBLE CLUTCH

FIELD

A hydraulic double clutch for a transmission with two coaxially arranged input shafts is disclosed. The hydraulic double clutch comprises a driven clutch housing and two hydraulically actuated clutches with friction disks and annular actuating pistons. The first clutch engages/disengages the clutch housing with/from the first input shaft, and the second clutch also engages/disengages the clutch housing with/from the second input shaft.

BACKGROUND

A double clutch is disclosed in EP 1 195 537 B1, having a clutch housing connected to a coupling hub with a mating connection. The coupling hub carries an annular coupling rail that connects the inner disk carrier to the coupling hub without rotational play. This coupling rail spatially separates the two clutches in the axial direction. However, it would be desirable to reduce the manufacturing costs and the weight of such a double clutch.

SUMMARY

A hydraulic double clutch is provided having an inner disk carrier that penetrates one of the actuating pistons at one end, and that this end of the inner disk carrier may be connected to the clutch housing without rotational play. Torque from the clutch housing can be directly transmitted to the inner disk carrier without torque transmission by the coupling hub itself. A torque-transmitting coupling rail may not be required. The reduction of torque-transmitting components can result in less weight, along with lower weight and manufacturing costs in comparison with conventional dual clutch arrangements. This arrangement also can result in a compact design and a high torque capacity.

The outside dimensions of the double clutch are determined in part by the friction disks, as well as the space required for the annular actuating pistons. A particularly compact design can be achieved by axially arranging the friction disks of both clutches one behind the other. In this case, both clutches may have a common pressure plate.

According to one aspect, the pressure plate may be connected to the inner disk carrier without rotational play. The pressure plate may be axially attached (to one or both sides) or be fixed in the axial direction. The attachment or fixing can be achieved with a retaining ring, which can make it possible to achieve a compact design and a functional separation of both clutches.

Instead of being axially fixed, the pressure plate may be integrally connected to the inner disk carrier. Depending on the manufacturing technology and the cost, an axial attachment, an axial fixing or an integral connection, for example, in the form of a one-piece design, may be utilized.

In another aspect, the inner disk carrier penetrates the other actuating piston at the other end. This can result in the inner disk carrier having axial mirror symmetry.

In another aspect, at least one of the inner disk carrier may be radially supported, centered prevented from turning and held without rotational play by the other actuating piston at the other end. Thus, forces acting on the inner disk carrier in the radial direction and/or forces acting in the circumferential direction are not exclusively absorbed at the transition between the clutch housing and the inner disk carrier, but also may be absorbed in part by the other actuating piston.

The clutch housing may be connected to a coupling hub without rotational play, and a cylinder may be provided that is axially attached to the coupling hub. The other actuating piston may be guided on the cylinder in an axially displaceable fashion. If the inner disk carrier is supported on the other actuating piston at the other end, as described above, the forces or moments generated can be absorbed by the coupling hub via the cylinder.

The inner disk carrier may be at least one of radially supported, centered, prevented from turning and held without rotational play by the cylinder at the other end. Consequently, the above-described forces and moments can be alternatively or additionally absorbed by the coupling hub directly via this cylinder.

According to another aspect, the clutch housing or the coupling hub may contain an additional cylinder on which an actuating piston is guided to move axially. This additional cylinder may have axial mirror symmetry with respect to the previously described cylinder. Both actuating pistons can be actuated against the force of one or more return springs.

It is possible to use any type of return spring. The return springs may consist, for example, of disk springs, coil springs or wave springs. The return springs may be supported on a compensating piston. Such a compensating piston serves for limiting an equalizing chamber for a hydraulic fluid, in which an increasing hydraulic pressure is built up as the speed increases. The hydraulic pressure being built up can counteract the hydraulic pressure in a pressure chamber required for actuating the clutches and prevents the given clutch from being unintentionally actuated. The return springs of both actuating pistons may also be supported on a common support element. In this case, the reaction forces of the return springs of the two actuating pistons act opposite to one another, which can result in the forces exerted on other components of the double clutch are comparatively low.

In order to reduce the structural space, the common support element preferably consists of an annular element that is at least one of axially attached to the coupling hub, connected to the coupling hub without rotational play, axially fixed on the coupling hub and integrally connected to the coupling hub. As mentioned above, the respective variant can be selected as a function of the construction, materials and manufacturing costs. It is not to provide special support devices for supporting the return springs of both actuating pistons. On the contrary, the two actuating pistons can be collectively supported on these return springs. The respective reaction forces are also directed inwardly in this case. This means that one actuating piston is supported relative to the other, thereby reducing the number of components.

According to another aspect, a respective compensating piston can be assigned to each actuating piston. The compensating pistons may be respectively supported on the inner disk carrier. It can suffice to support the compensating pistons on continuous (or interrupted) circumferential rails provided on the inside circumference of the inner disk carrier. Attachment may also be accomplished with the aid of retaining rings.

According to another aspect, a compensating piston can be assigned to each actuating piston. The compensating pistons may be supported on a common support element. An annular element of the above-described type may be provided as the support element. The annular element can be at least one of axially attached to the coupling hub, connected to the coupling hub without rotational play, axially fixed on the coupling hub and integrally connected to the coupling hub.

The friction disks can contain friction surfaces. The average friction radii of the friction disks may be generally the same. This variant provides the advantage that both clutches of the double clutch are able to transmit generally the same forces and/or moments. Thus, both clutches have very similar engagement and disengagement characteristics. Generally the same engagement and disengagement characteristics can be achieved if the friction surfaces of the friction disks are generally similar. With respect to structural and functional considerations, as well as for reasons of manufacturing technology, it can be advantageous to realize both clutches of the double clutch generally the same, and both clutches can be generally mirror-symmetrically relative to the axial direction.

DETAILED DESCRIPTION OF THE DRAWINGS

Figure 1:
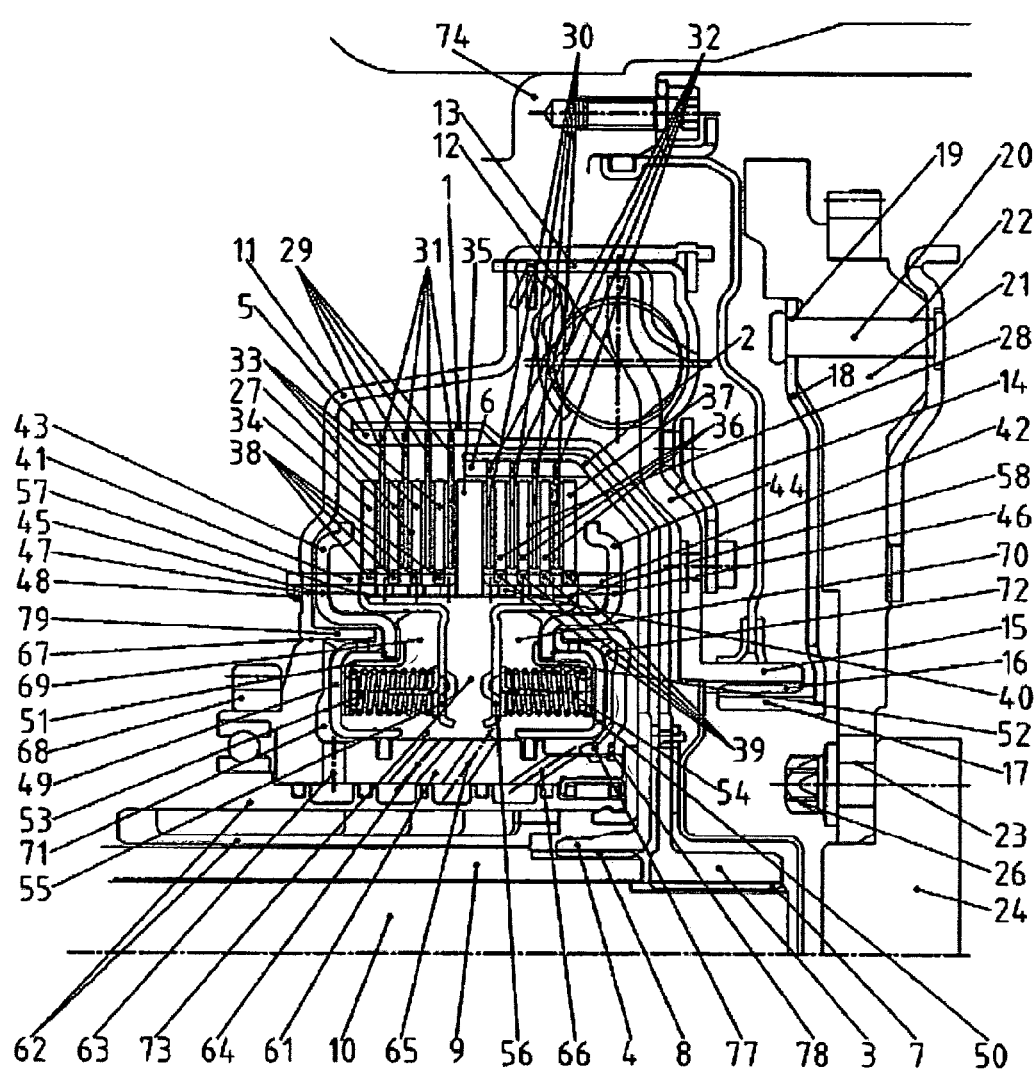
FIG. 1 is cross-section view of a drive train in a first embodiment of the double clutch.

FIG. 1 shows, by way of example, a basic design of a double clutch in the form of a drive train section for a motor vehicle. A crankshaft 24 that is coupled, for example, to an internal combustion engine, a motor or the like is indicated on the right side of the figure. This side represents the driving side of the drive train. Two output shafts are illustrated on the left side of the figure, namely a central output shaft 10 and a concentric outer output shaft 9. These two shafts extend out of the clutch bell 74 of the double clutch and are coupled, for example, to a (not shown) transmission or the like. This side represents the driven side of the drive train. For example, the inner output shaft 10 may serve for shifting all odd gears (e.g., 1, 3, 5 . . . ), and the outer output shaft 9 may serve for shifting all even gears (e.g., 2, 4, 6 . . . ). The reverse gear could be assigned to the inner output shaft 10 or to the outer output shaft 9.

The drive train contains a flywheel mass 21, a disk 18 with a low resistance to flexing/wobbling, a torsional vibration damper 12 as well as the aforementioned double clutch according to the invention.

This drive train is enclosed by an outer housing. This outer housing is formed by the above-mentioned clutch bell 74. The clutch bell 74 consequently encompasses both clutches that are realized in the form of wet-running disk clutches, the torsional vibration damper 12, the disk 18 with a low resistance to bending and/or wobbling and the flywheel mass 21.

The pendular or torsional vibration damper 12 is realized conventionally. On its input side, it contains a primary element 14 in the form of a half-shell. The output side is provided with a secondary element that is composed of a first half-shell 13 and a second half-shell 11 and simultaneously forms the clutch housing. The primary element 14 and the secondary elements 11 and 13 are coupled to one another such that torque can be transmitted in the rotating direction by means of a series of spring assemblies arranged on the outer circumference of the pendular damper 12. An example of a spring assembly is illustrated in the figure.

The two half-shells 11, 13, 14 and the torsional vibration damper 12 surround the two individual clutches of the double clutch. The clutches respectively comprise an outer disk carrier 1, 2 and a common inner disk carrier 40. In the following description, the outer disk carrier of the first clutch is referred to as the first outer disk carrier 1 and the outer disk carrier of the second clutch is referred to as the second outer disk carrier 2. Both outer disk carriers 1, 2 are realized in the form of half-shells, wherein the first outer disk carrier I encompasses the second outer disk carrier 2 in an axially protruding fashion. The inner disk carrier 40 has an essentially cylindrical form and extends over the axially extending regions of the half-shells 1, 2. Both outer disk carriers 1, 2 contain internal gears 5, 6 that serve for respectively guiding, in this case, four friction disks 29, 30 with corresponding external gears 31, 32 to move axially essentially without rotational play. The latter are usually referred to as outer disks 29, 30. The outside circumference of the inner disk carrier sections of the common inner disk carrier 40 that are assigned to the respective outer disk carriers 1, 2 are provided with corresponding external gears 41, 42, in which friction disks provided with internal gears, namely the so-called the inner disks 36, are guided to be displaceable axially without rotational play. Both inner disk carrier sections are separated by a common end plate 35.

Analogous to the above-described inner disks 36, pressure plates 34, 37 are respectively guided on both outer ends of the common inner disk carrier 40 to be axially displaceable essentially without rotational play.

The outer friction disks/outer disks 29, 30, the inner friction disks/inner disks 33, 36, as well as both pressure plates 34, 37 and the common end plate 35, are mutually engaged in a gear-like fashion such that disk assemblies 27, 28 are formed, where these disk assemblies are respectively assigned to one clutch. Both disk assemblies 27, 28 with the corresponding friction disks 29, 30, 33, 34, 35, 36, 37 consequently are arranged axially one behind the other on the common inner disk carrier 40. In the embodiment shown, the friction surfaces of all friction disks 29, 30, 33, 34, 35, 36, 37 essentially have the same general size such that the individual clutches have equivalent capabilities. The friction surfaces of the friction disks may have different diameters.

Other important components of the clutches are piston/cylinder units, which are used for actuating the clutches, as described in greater detail below. A hydraulically actuated actuating piston 43, 44 is assigned, in particular, to each clutch. Each of these actuating pistons 43, 44 can be pressed against one of the pressure plates 34, 37 in a force-transmitting fashion such that the individual friction disks 29, 30, 33, 34, 35, 36, 37 are functionally engaged and the respective clutch is actuated. FIG. 1 shows that both clutches are actuated inwardly where the reaction forces act against the common end plate 35.

The common inner disk carrier 40 extends through both annular actuating pistons 43, 44 required for actuating the clutches. For this purpose, the respective ends of the inner disk carrier are provided with rails that essentially extend axially over the outside circumference and through corresponding openings 45, 46 of the respective actuating piston 43, 44 in a gear-like fashion. These rails also extend through correspondingly provided openings 47 in the clutch housing 11 on at one end. The openings 47 in the clutch housing 11 (and normally also the openings 45, 46 in the actuating pistons 43, 44) are adapted to one another with respect to their circumferential dimensions in such a way that no relative movement is possible. Consequently, the inner disk carrier 40 is connected without rotational play to the clutch housing 11. In order to restrict axial displacement of the inner disk carrier 40, a retaining ring 48 is provided that fixes the inner disk carrier 40 on the clutch housing 11.

The clutch housing 11 is integrally connected to a coupling hub 61 at a seam 67. This coupling hub 61 coaxially encompasses both gear input shafts 9, 10. The coupling hub 61 carries a half-shell-shaped cylinder 77. The axial displacement of this cylinder 77 is limited by a retaining ring 78.

The clutch housing 11 contains a cylinder 79 that corresponds to the aforementioned cylinder 77. The respective actuating pistons 43, 44 are guided in to move axially on the two cylinders 77, 79. The cylinder 77 and the actuating piston 44 serve for supporting and centering the inner disk carrier 40.

In addition to the above-described actuating pistons 43, 44 for displacing the respective pressure plates 34, 37 of the disk assemblies 27, 28 in the direction of the common end plate 35, each of the actuating devices for both clutches contain a pressure piston 49, 50, a piston 51, 52, a compensating piston 55, 56 and sets of coil springs 53, 54 that are arranged in the circumferential direction. The respective actuating pistons 43, 44 are outwardly supported on the respective pressure pistons 49, 50 that are guided to move axially on the cylinders 79, 77 and on the outside circumference of the coupling hub 61. The actuating pistons 43, 44 are inwardly supported on the pistons 51, 52. These pistons, in turn, are inwardly supported on the coil springs 53, 54. The coil springs 53, 54 are inwardly supported on the outside surfaces of the compensating pistons 55, 56. The inside surfaces of these compensating pistons 55, 56 are supported on circumferential webs 57, 58 on the inner disk carrier 40 that are directed radially inward.

Although the entire clutch system could be directly supported on the second gear input shaft (hollow shaft 9), a separate flange-like part that is referred to as a carrier 62 below is provided in the embodiment shown. This carrier coaxially surrounds both gear input shafts, namely the hollow shaft 9 and the solid shaft 10, where the coupling hub 61 is rotatably supported on this carrier. In the embodiment shown, sliding bearings are used for supporting the coupling hub 61 on the carrier 62. Roller or needle bearings are used in an alternative embodiment in order to reduce the friction moment.

The carrier 62 may be realized in one piece. Alternatively, it may also consist of several pieces in the axial and radial directions. In the embodiment shown, the carrier 62 consists of two parts, namely a casing and a bushing that is surrounded by said casing. The bushing in the form of a cylinder jacket contains longitudinal grooves of different lengths in its outside circumference, wherein said grooves extend in the axial direction. The casing contains four grooves that extend in the circumferential direction and are arranged such that they correspond to the above-described longitudinal grooves. These circumferential grooves are connected to the corresponding longitudinal grooves by means of radially extending openings that (illustrated).

The coupling hub 61 contains four openings that essentially extend radially and, in part, in an axially inclined fashion, wherein said openings correspond to the circumferential grooves and are referred to as hydraulic fluid channels 63, 64, 65 and 66 below. The chambers formed by the pistons 43, 44, 49, 50, 55, 56 (first hydraulic actuating chamber 71, second hydraulic actuating chamber 72, first hydraulic compensating chamber 69, second hydraulic compensating chamber 70, cooling fluid chamber 73) are supplied with hydraulic fluid via these hydraulic fluid channels 63, 64, 65, 66.

The first hydraulic actuating chamber 71 can be subjected to pressure by means of hydraulic fluid supplied via the first hydraulic fluid channel 63. This hydraulic pressure causes the pressure piston 49, and consequently the actuating piston 45 and the piston 51, to be pressed inwardly against the force of the coil springs 53. Such a displacement of the actuating piston 45 causes its outside circumference to be pressed against the pressure plate 34 of the first clutch such that this first clutch is actuated.

Analogously, the second hydraulic actuating chamber 72 can be subjected to pressure by means of hydraulic fluid supplied via the fourth hydraulic fluid channel 66. This hydraulic pressure causes the pressure piston 50, and consequently the actuating piston 44 and the piston 52, to be pressed inward against the force of the coil springs 54. Accordingly, this causes the outside circumference of the actuating piston 44 to be pressed against the pressure plate 37 of the second clutch such that this second clutch is actuated.

The hydraulic compensating chambers 69, 70 as well as the cooling fluid chamber 73 are filled with hydraulic fluid via the two hydraulic fluid channels 64 and 65. The hydraulic fluid in the hydraulic compensating chambers 69, 70 serves for generating a pressure that counteracts the hydraulic pressure by means of the centrifugal force. This counterpressure prevents the centrifugal force from increasing the pressure in the respective hydraulic actuating chamber 71, 72. The hydraulic fluid in the cooling fluid chamber 73 serves for cooling the friction disks 29, 30, 33, 34, 35, 36, 37 and is conveyed to the friction disks 29, 30, 33, 34, 35, 36, 37 through (not shown) radially extending openings in the inner disk carrier 40.

The manner in which the components of the drive train that were described in detail above are connected to one another is described below. The crankshaft 24 is screwed to the inside circumference of the flywheel mass 21 (screw 26, bore 23). The outside circumference of the flywheel mass 21 is riveted to the outside circumference of the disk 18 with low resistance to flexing/wobbling (outer edge bore 19, rivet 20, bore 22). The inside circumference of the disk 18 with low resistance to flexing/wobbling carries an inner flange 17 with an exterior gear. This exterior gear is engaged with an internal gear of the primary element 14 of the torsional vibration damper 12 in the form of a mating connection 16 such that an engagement without rotational play is produced.

The secondary element 13 of the torsional vibration damper 12 that simultaneously forms the clutch housing is connected to the inner disk carrier 40 of the double clutch without rotational play as described above.

Both clutches (disk assemblies 27, 28; actuating pistons 44, 45) engages/disengages the inner disk carrier 40 to/from the outer disk carriers 1, 2, where the flanges 3, 4 of the outer disk carriers are connected without rotational play to the two input shafts 9, 10 in the form of a mating connection 7, 8.

This means that torque introduced via the crankshaft 24 can be transmitted to one or both input shafts 9, 10 by means of the double clutch.

A rotational movement can be introduced via the crankshaft 24 drives a (not shown) hydraulic pump for generating the above-mentioned hydraulic pressure, namely by means of a pump driving gear 68 arranged on the coupling hub 61.

Figure 2:
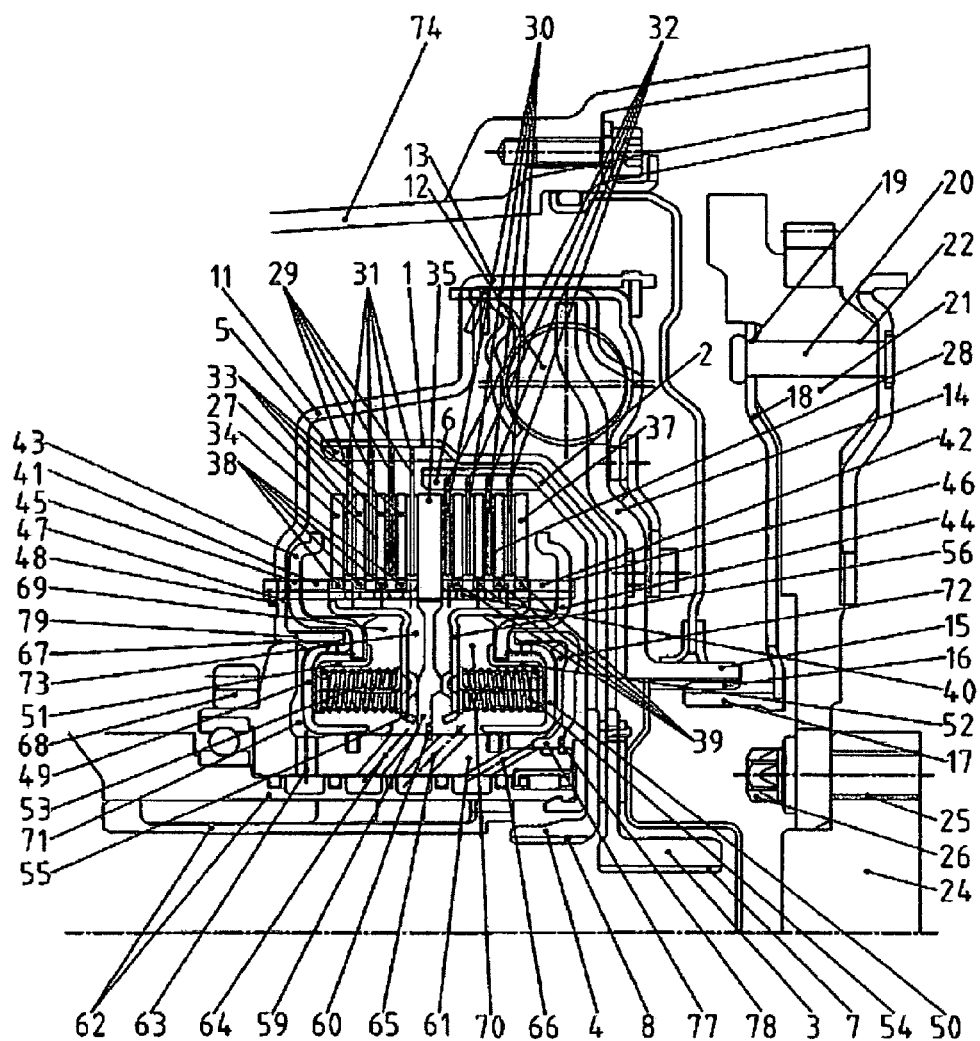
FIG. 2 is cross-section view of a drive train in a second embodiment of the double clutch.

FIG. 2 shows a drive train section of the previously described type with a second embodiment of a double clutch. The embodiment of a double clutch that is illustrated in FIG. 2 differs from the embodiment described above with reference to FIG. 1 in that the compensating pistons 55, 56 are not supported on circumferential rails 57, 58 arranged on the inner disk carrier, but rather on an annular element 59 that is supported and secured on the coupling hub 61 with a retaining ring 60.

In addition to its function of axially supporting the compensating pistons 55, 56 and the actuating devices consisting of actuating pistons 43, 44, pressure pistons 43, 50, pistons 51, 52 and coil springs 53, 54, the annular element 59 also serves for conveying hydraulic fluid to the friction disks 29, 30, 33, 34, 35, 36, 37. For this purpose, the annular element 59 contains a thickening on the side of its outside circumference, wherein said thickening deflects inflowing hydraulic fluid in the axial direction.

Figure 3:
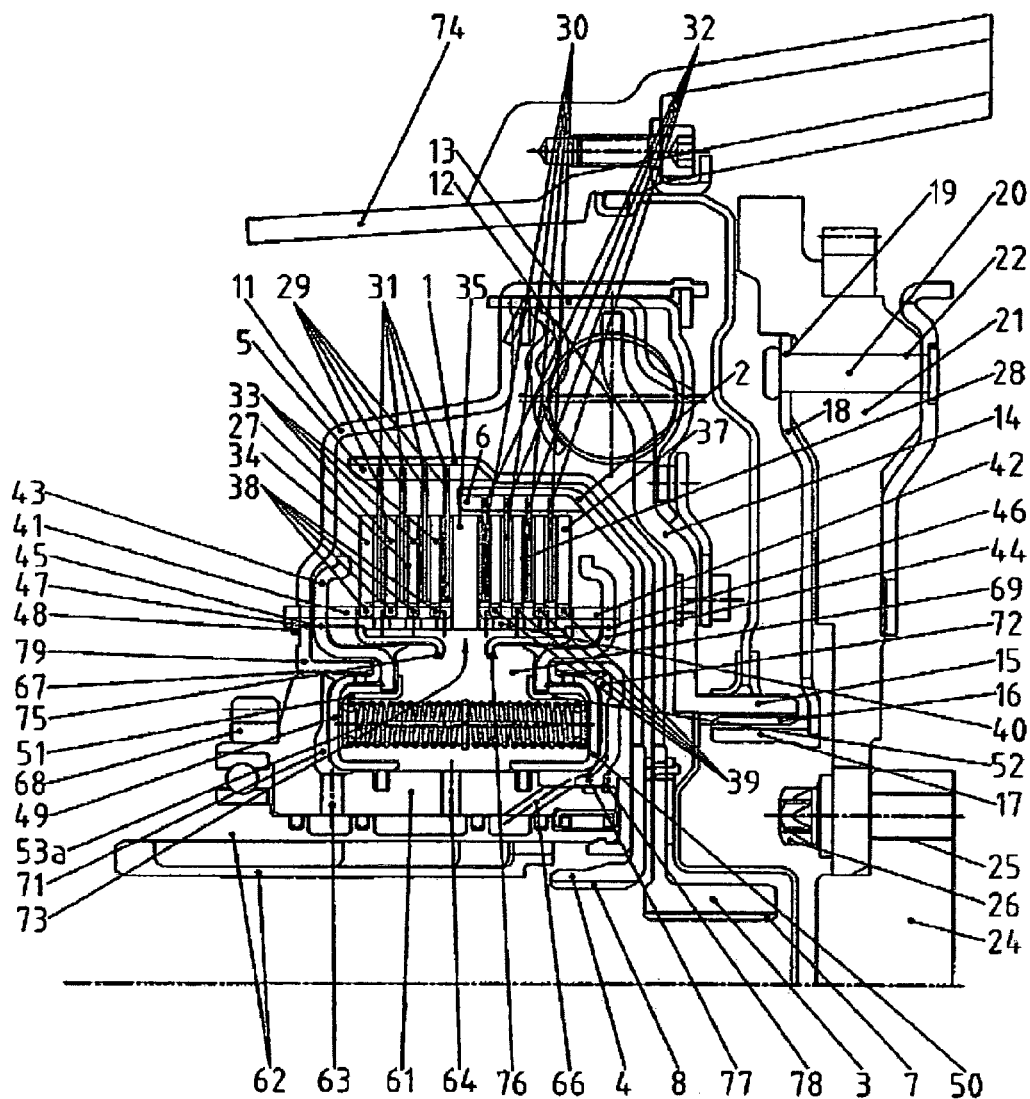
FIG. 3 is cross-section view of a drive train in a third embodiment of the double clutch.

FIG. 3 shows another drive train section of the previously described type with a third embodiment of a double clutch. The embodiment illustrated in FIG. 3 differs from the double clutches according to the first two embodiments in that no compensating pistons 55, 56 are provided. In this case, a set of coil springs 53a that are arranged in the circumferential direction is provided instead of coil springs 53, 54 that are respectively assigned to the individual actuating pistons 43, 44, wherein said coil springs are braced supported against the actuating piston 43 via the piston 51 at one end and against the actuating piston 44 via the piston 52 at the other end. The two compensating pistons 55, 56 are replaced with two baffle plates 75, 76 for the cooling fluid that are integrally connected to the inner disk carrier and convey the hydraulic fluid to the friction disks 29, 30, 33, 34, 35, 36, 37 for cooling purposes.

While the inventions have been described by reference to certain specific descriptive examples which illustrate preferred materials and conditions, it is understood that the invention is not limited thereto. Rather, all alternatives, modifications and equivalents within the scope of the inventions so described are considered to be within the scope of the appended claims.

What is claimed is:

1. A dual clutch assembly for a transmission with two coaxially arranged output shafts, the clutch assembly comprising:
    a clutch housing member driven by a torque input;
    two clutches within the clutch housing and radially spaced from a rotatable hub, each clutch having a first set of friction elements and a second set of friction elements, the first clutch having an actuating piston selectively engaging the friction elements transferring torque from the clutch housing member to the inner output shaft, and the second clutch having an actuating piston selectively engaging the friction elements transferring torque from the clutch housing member to the outer output shaft, both actuating pistons can be actuated against the force of one or more return springs braced against a support element of a compensating piston; and
    the first friction elements of each clutch mounted on a common disk carrier, at least one end of the common disk carrier supported by and engaged with the clutch housing member transferring torque therethrough to the first friction elements, the disk carrier and at least one of the actuating pistons cooperating to transfer torque from the clutch housing member to the first friction elements without passing substantial torque through the hub, the clutch housing member being connected to the hub, a cylinder is provided and axially attached to the hub, and at least one actuating piston is guided to be axially displaceable on the cylinder.

2. The dual clutch assembly of claim 1, wherein the return springs are braced against a common support element axially attached to at least the hub.

3. A dual clutch assembly for a transmission with two coaxially arranged output shafts, the clutch assembly comprising:
    a clutch housing member driven by a torque input;
    two clutches within the clutch housing and radially spaced from a rotatable hub, each clutch having a first set of friction elements and a second set of friction elements, the first clutch having an actuating piston selectively engaging the friction elements transferring torque from the clutch housing member to the inner output shaft, and the second clutch having an actuating piston selectively engaging the friction elements transferring torque from the clutch housing member to the outer output shaft, both actuating pistons can be actuated against the force of one or more return springs, both actuating pistons jointly supported on one or more common return spring; and
    the first friction elements of each clutch mounted on a common disk carrier, at least one end of the common disk carrier supported by and engaged with the clutch housing member transferring torque therethrough to the first friction elements, the disk carrier and at least one of the actuating pistons cooperating to transfer torque from the clutch housing member to the first friction elements without passing substantial torque through the hub, the clutch housing member being connected to the hub, a cylinder is provided and axially attached to the hub, and at least one actuating piston is guided to be axially displaceable on the cylinder.

4. A hydraulic double clutch for a transmission, the clutch comprising:
    first and second coaxially arranged output shafts;
    a driven clutch housing;
    a first hydraulically actuated clutch, the first clutch comprising a plurality of disks associated with the first output shaft and a plurality of disks associated with the driven clutch housing, the disks associated with the first output shaft intermeshing with the disks associated with the driven clutch housing, the intermeshing disks being compressed by a first actuating piston to selectively engaging the clutch housing with the first output shaft for rotation therewith;
    a second hydraulically actuated clutch, the second clutch comprising a plurality of disks associated with the second output shaft and a plurality of disks associated with the driven clutch housing, the disks associated with the second output shaft intermeshing with the disks associated with the driven clutch housing, the intermeshing disks being compressed by a second actuating piston to selectively engaging the clutch housing with the second output shaft for rotation therewith;
    a common disk carrier of the first and second clutch having axial extensions passing through openings in one of the first and second actuating pistons, the axial extensions connected to the clutch housing transferring torque therethrough to drive the plurality of disks associated with the driven clutch housing for rotation.

5. A dual clutch assembly for a transmission with two coaxially arranged output shafts, the clutch assembly comprising:
    a clutch housing member driven by a torque input;
    two hydraulically actuated clutches within the clutch housing and radially spaced from a rotatable hub, each clutch having a first set of friction elements and a second set of friction elements, the first clutch having an actuating piston selectively engaging the friction elements transferring torque from the clutch housing member to the inner output shaft, and the second clutch having an actuating piston selectively engaging the friction elements transferring torque from the clutch housing member to the outer output shaft; and the first friction elements of each clutch mounted on a common disk carrier, at least one end of the common disk carrier supported by and engaged with the clutch housing member transferring torque therethrough to the first friction elements, the disk carrier and at least one of the actuating pistons cooperate to transfer torque from the clutch housing member to the first friction elements without passing substantial torque through the hub, at least one end of the common disk carrier having axial extensions passing through openings in at least one of the actuating pistons, the common disk carrier having a cylindrical form and the axial extensions fixed to the torque transfer member.

6. The dual clutch assembly of claim 5, wherein the other end of the common disk carrier is engaged with a second actuating piston configured to support, center and prevent substantial rotational play between the common disk carrier and the second actuating piston.

* * * * *